(12) United States Patent
Lin

(10) Patent No.: US 9,152,002 B2
(45) Date of Patent: Oct. 6, 2015

(54) ELECTRICAL WRITING BOARD

(71) Applicant: HON HAI PRECISION INDUSTRY CO., LTD., New Taipei (TW)

(72) Inventor: Chen-Han Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/249,335

(22) Filed: Apr. 9, 2014

(65) Prior Publication Data

US 2014/0307303 A1 Oct. 16, 2014

(30) Foreign Application Priority Data

Apr. 16, 2013 (TW) .............................. 102113408 A

(51) Int. Cl.
G02F 1/155 (2006.01)
G02F 1/1333 (2006.01)

(52) U.S. Cl.
CPC ............ *G02F 1/155* (2013.01); *G02F 1/13338* (2013.01); *G02F 2001/1552* (2013.01)

(58) Field of Classification Search
CPC ................ G02F 1/155; G02F 1/13338; G02F 2001/1552; G09G 3/38; G09G 3/20; G06F 1/3218; G06F 3/0412
See application file for complete search history.

(56) References Cited

U.S. PATENT DOCUMENTS 6,225,976 B1 * 5/2001 Yates et al. ..................... 345/156
7,002,723 B2 * 2/2006 Enomoto et al. .............. 359/273
7,158,276 B1 * 1/2007 Peng et al. ..................... 359/265
2012/0242606 A1 * 9/2012 Mackey ........................ 345/173

* cited by examiner

*Primary Examiner* — David N Spector
(74) *Attorney, Agent, or Firm* — Novak Druce Connolly Bove + Quigg LLP

(57) ABSTRACT

An electrical writing board includes a bottom color plate, an electrochromic board, a touch panel, and a driving circuit module. The electrochromic board is covered on the bottom color plate, and includes a plurality of electrochromic units. The touch panel is covered on the electrochromic board, and outputs a touch signal when the touch panel is touched. The driving circuit module is electrically connected between the electrochromic board and the touch panel, and enables a part of the electrochromic units according to the touch signal to display a handwriting. The handwriting displaying on the electrochromic board is the same as a touch route sensed by the touch panel.

11 Claims, 4 Drawing Sheets

ELECTRICAL WRITING BOARD

BACKGROUND

1. Technical Field

The present disclosure relates to writing boards, and particularly to an electrical writing board.

2. Description of the Related Art

Electrical writing boards generally include a writing board, a computer, and a projector. The writing board senses a touch position of a user and transmits the touch position to the computer. The computer generates a handwriting according to the touch positions via writing software, and controls the projector to project an image including the handwriting on the writing board. However, as the writing board should connect to the computer and the projector, the structure of the electrical writing board is complex, which increases a cost.

Therefore, it is desirable to provide an electrical writing board to overcome the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
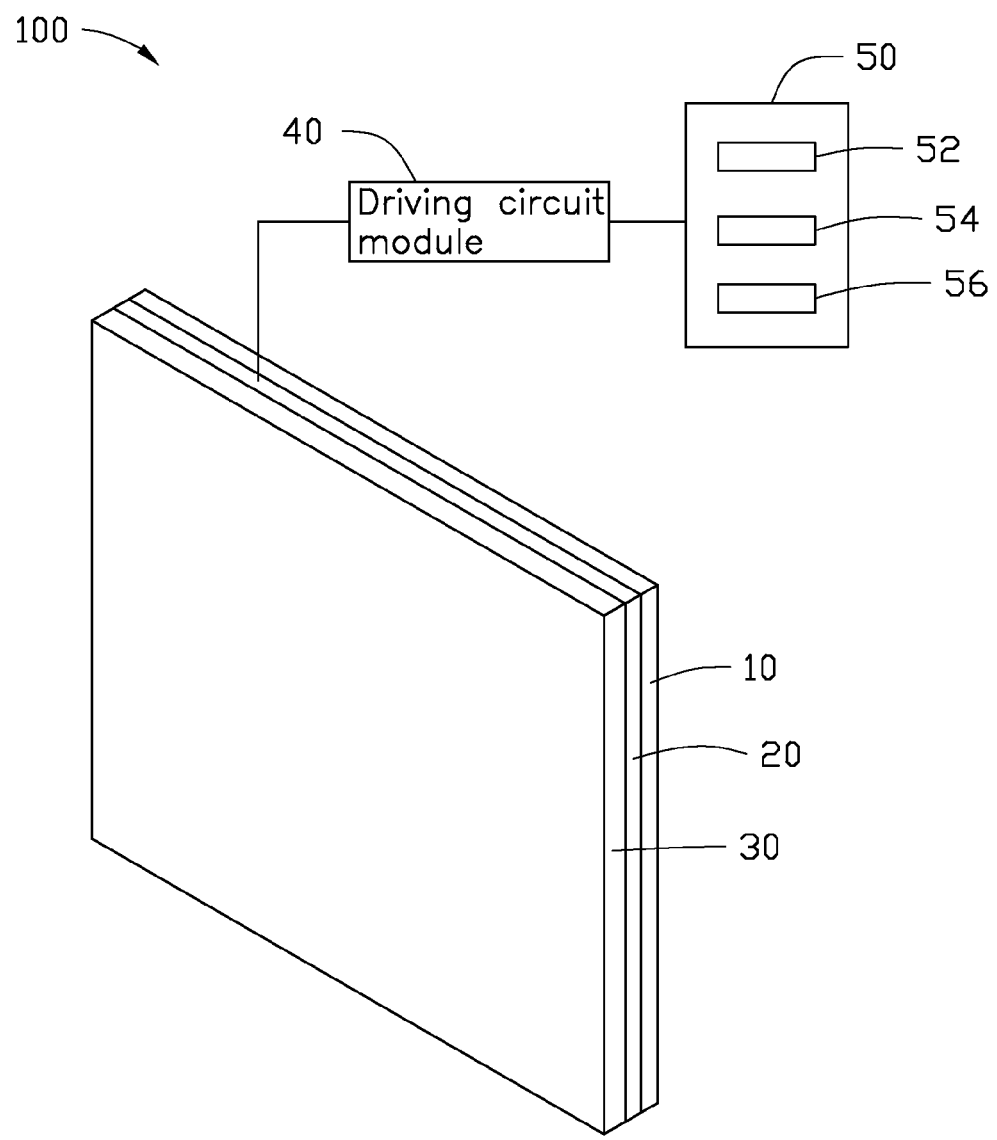
FIG. 1 is an assembled view of an embodiment of an electrical writing board.
Figure 2:
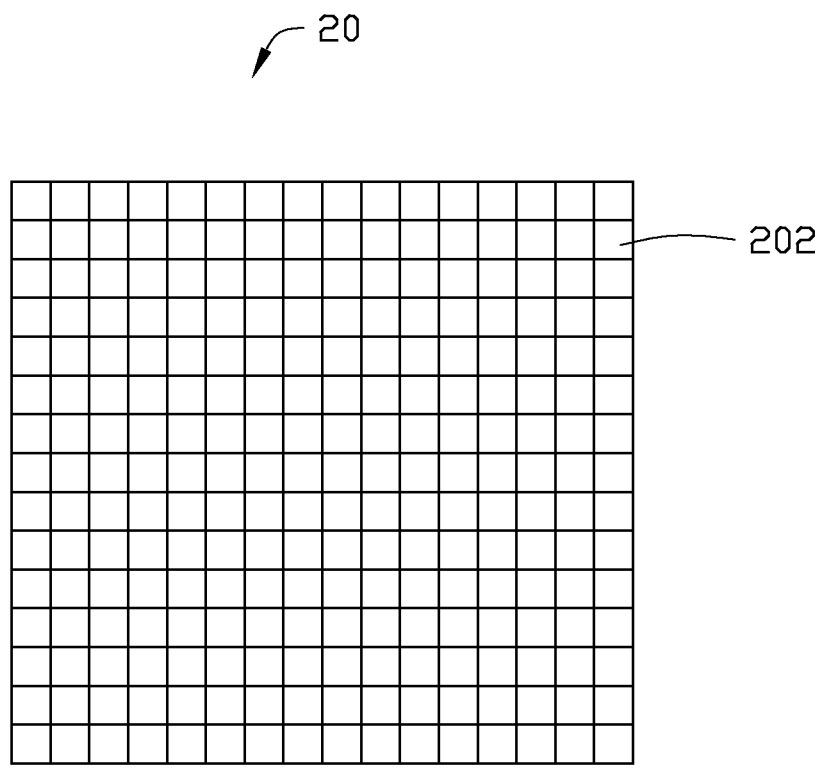
FIG. 2 is an isometric view of an electrochromic board of the electrical writing board of FIG. 1.
Figure 3:
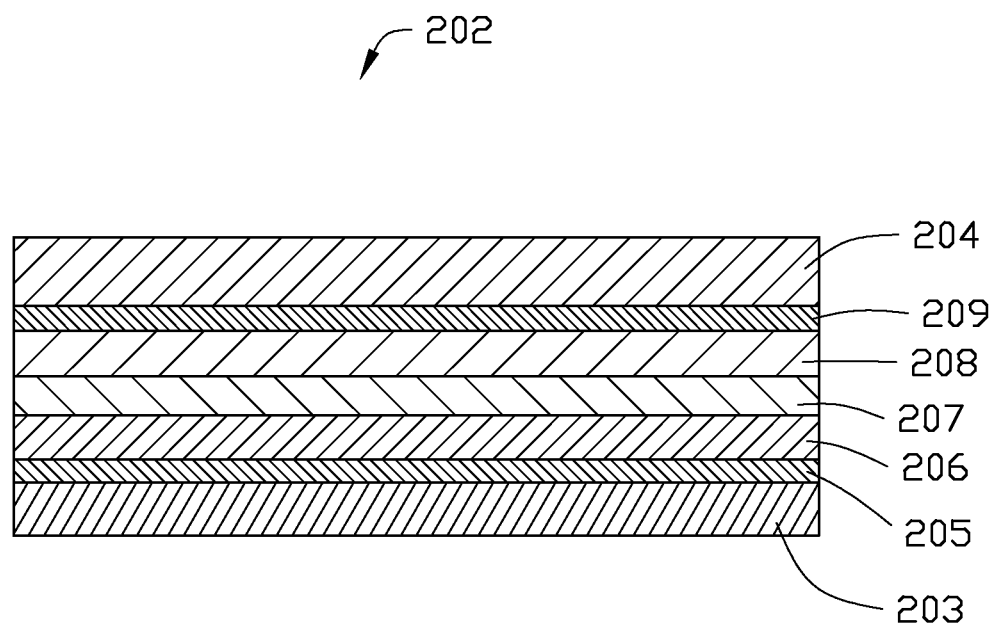
FIG. 3 is a cross-sectional view of an electrochromic unit of the electrochromic board of FIG. 2.
Figure 4:
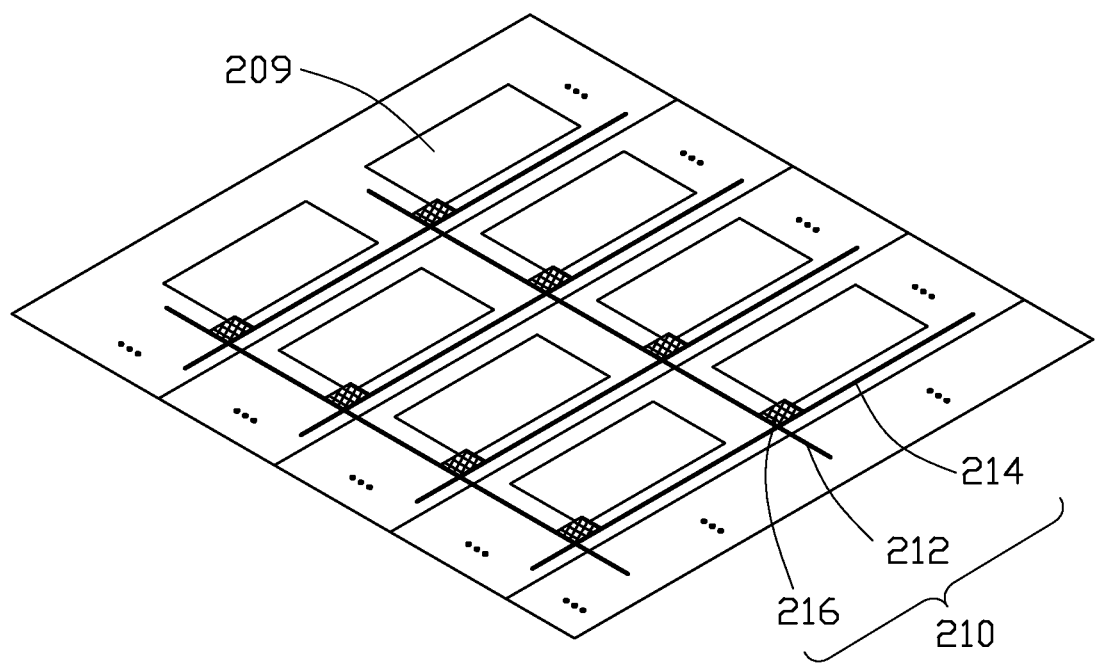
FIG. 4 is a driving circuit diagram of the electrochromic board of FIG. 2.

FIGS. 1-4 show an embodiment of an electrical writing board 100. The electrical writing board 100 includes a bottom color plate 10, an electrochromic board 20, a touch panel 30, a driving circuit module 40, and an operation module 50.

The bottom color plate 10 is a rectangle, and is made of plastic or metal. The bottom color plate 10 includes a top surface (not labeled) and a bottom surface (not labeled) opposite to the top surface. A color film (not shown) is covered on the top surface. A color of the color film is greatly different from a color of the electrochromic board 20, therefore a handwriting formed on the electrochromic board 20 can be distinctly seen by an user. In the embodiment, the color of the color film is black or white.

The electrochromic board 20 is covering the bottom color plate 10. The electrochromic board 20 includes a number of electrochromic units 202. The electrochromic board 20 is a multi-layers structure, the structures of the electrochromic units 202 are the same. Each electrochromic unit 202 includes two transparent substrates 203, 204, and a first electrode layer 205, an electrochromic layer 206, an ion conductive layer 207, an ion storage layer 208, and a second electrode layer 209. The first electrode layer 205, the electrochromic layer 206, the ion conductive layer 207, the ion storage layer 208, and the second electrode layer 209 are orderly sandwiched between the transparent substrates 203, 204. The transparent substrate 203 is covering the bottom color plate 10.

The transparent substrates 203, 204 are made of glass, sapphire, or transparent flexibility material. The first electrode layer 205 and the second electrode layer 209 are transparent, and made of indium oxide (ITO). The first electrode layer 205 includes a number of pixel electrodes respectively corresponding to the electrochromic units 202. The second electrode layer 209 is a common electrode.

The electrochromic layer 206 is made of electrochromic materials including inorganic electrochromic materials and organic electrochromic materials. The inorganic electrochromic materials include a mixture of cerium dioxide and silicon dioxide ($CeO_2$—$TiO_2$), nickel oxide (NiOx), tungsten trioxide ($WO_3$), Manganese dioxide ($MnO_2$). The organic electrochromic materials include a bipyridine salt, a conductive polymer, an organometallic polymer, and a metal phthalocyanine. When a voltage drop is applied between the first electrode layer 205 and the second electrode layer 209 of the electrochromic unit 202, the color of the electrochromic layer 206 of the electrochromic unit 202 changes between colored and colorless.

The ion conductive layer 207 is an ion passage between the electrochromic layer 206 and the ion storage layer 208. Ions stored in the ion storage layer 208 move to the electrochromic layer 206 from the ion conductive layer 207 under the voltage drop applied between the first electrode layer 205 and the second electrode layer 209. The ions reaching the electrochromic layer 206 move to the ion storage layer 208 from the ion conductive layer 207 when the voltage drop applied between the first electrode layer 205 and the second electrode layer 209 is removed.

The electrochromic board 20 further includes a control circuit 210, printed on a side of the first electrode layer 205. The control circuit 210 includes a number of horizontal scanning lines 212 and a number of vertical scanning lines 214. The horizontal scanning lines 212 perpendicularly cross the vertical scanning lines 214. Each electrochromic unit 202 is positioned at a corner of an intersection point of one horizontal scanning line 212 and one vertical scanning line 214. A number of switching elements 216 are positioned at the corners of the intersection points, and electrically connected to the horizontal scanning line 212 and the vertical scanning line 214. Each switching element 216 is connected to the first electrode layer 205 of the adjacent one electrochromic unit 202. If both of the horizontal scanning line 212 and the vertical scanning line 214 connected to the switching elements 216 are input a high level signal (logic 1), the corresponding switching element 216 is turned on, and a voltage is applied on the first electrode layer 205 of the corresponding electrochromic unit 202.

The touch panel 30 is covered on the electrochromic board 20, and is configured for outputting a touch signal when the touch panel 30 is touched. In the embodiment, the touch panel 30 can be a resistive touch panel, a capacitive touch panel, or an infrared touch panel.

The driving circuit module 40 is connected between the touch panel 30 and the controlling circuit 210. The driving circuit module 40 outputs enable signals to the control circuit 210 according to the touch signals outputting from the touch panel 30.

The operation module 50 is electrically connected to the driving circuit module 40, and includes a power button 52, a writing button 54, and an erasing button 56. The electrical writing board 100 is turned on or turned off by pressing the power button 52. The handwriting of the user can display on the electrical writing board 100 when the writing button 54 is pressed. The handwriting displaying on the electrical writing board 100 can be erased by the user when the erasing button 56 is pressed.

In use, first, the power button 52 is turned on by the user, and the writing button 54 is pressed. Then, the user touches the touch panel 30 to write a number, a letter, or a Chinese character. The touch panel 30 generates the touch signals and outputs the touch signals to the driving circuit module 40. The driving circuit module 40 enables the corresponding electrochromic unit 202 by the switching elements 216 according to the touch signals. Therefore, the handwriting of the user is displayed on the electrochromic board 20. The handwriting displayed on the electrochromic board 20 is the same as a touch route sensed by the touch panel 30. When the user wants to erase the handwriting, the user presses the erase button 56. The user touches the touch panel 30, the driving circuit module 40 switches off all of the electrochromic units 202. Therefore, the handwriting displaying on the electrochromic board 20 is erased.

In other embodiments, the bottom color plate 10, the electrochromic board 20, and the touch panel 30 can be packaged in one cell, and then the transparent substrates 203, 204 can be removed. The bottom color plate 10 and the touch panel 30 are respectively covered on the first electrode layer 205 and the second electrode layer 209. Furthermore, the ion storage layer 208 can be another electrochromic layer made of different electrochromic materials with the electrochromic layer 206. The characteristic of the electrochromic materials of the ion storage layer 208 is contrary to the characteristic of the electrochromic materials of the electrochromic layer 206. For example, the electrochromic layer 206 is made of anodic oxidation electrochromic materials, and the ion storage layer 208 is made of cathode reduction electrochromic materials.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An electrical writing board, comprising:
a bottom color plate;
an electrochromic board covered on the bottom color plate and comprising a plurality of electrochromic units made of electrochromic material, the electrochromic board configured to reversibly changing color when triggered by an electrical potential to cause electrochemical redox reactions in the electrochromic material;
a touch panel covered on the electrochromic board, the electrochromic board located between the bottom color plate and the touch panel, and the touch panel outputting a touch signal when the touch panel is touched; and
a driving circuit module electrically connected between the electrochromic board and the touch panel, and enabling a part of the electrochromic units according to the touch signal to display a handwriting; wherein the handwriting displaying on the electrochromic board is the same as a touch route sensed by the touch panel.

2. The electrical writing board of claim 1, wherein a color of the bottom color plate is different from a color of the electrochromic board.

3. The electrical writing board of claim 1, further comprising an operation module electrically connected to the driving circuit module, wherein the operation module comprises a power button, a writing button, and an erasing button; the electrical writing board is turn on or turn off by pressing the power button, the handwriting of the user is displayed on the electrical writing board when the writing button is pressed, the handwriting displaying on the electrical writing board is erased when the erasing button is pressed.

4. The electrical writing board of claim 1, wherein the electrochromic board comprises a first electrode layer, an electrochromic layer, an ion conductive layer, an ion storage layer, and a second electrode layer orderly sandwiched between the bottom color plate and the touch panel.

5. The electrical writing board of claim 4, wherein the ion conductive layer is an ion passage between the electrochromic layer and the ion storage layer; ions stored in the ion storage layer move to the electrochromic layer from the ion conductive layer under the voltage drop applied between the first electrode layer and the second electrode layer.

6. The electrical writing board of claim 4, wherein the electrochromic board further comprises two transparent substrates, all of the first electrode layer, the electrochromic layer, the ion conductive layer, the ion storage layer, and the second electrode layer are sandwiched the two transparent substrates.

7. The electrical writing board of claim 4, wherein the electrochromic layer of the electrochromic unit is made of inorganic electrochromic materials or organic electrochromic materials, the inorganic electrochromic materials comprise a mixture of cerium dioxide and silicon dioxide ($CeO_2$—$TiO_2$), nickel oxide (NiOx), tungsten trioxide ($WO_3$), Manganese dioxide ($MnO_2$), the organic electrochromic materials comprise a bipyridine salt, a conductive polymer, an organometallic polymer, and a metal phthalocyanine.

8. The electrical writing board of claim 7, wherein when a voltage drop is applied between the first electrode layer and the second electrode layer of the electrochromic unit, the color of the electrochromic layer of the electrochromic unit is changed between colour and colourless.

9. The electrical writing board of claim 4, wherein the electrochromic board further comprises a controlling circuit, and the controlling circuit is printed on a side of the first electrode layer.

10. The electrical writing board of claim 9, wherein the controlling circuit comprises a plurality of horizontal scanning lines and a plurality of vertical scanning lines, the horizontal scanning lines perpendicularly cross the vertical scanning lines, each electrochromic unit is positioned at a corner of an intersection point of one horizontal scanning line and one vertical scanning line.

11. The electrical writing board of claim 10, wherein a plurality of switching elements is positioned at the corners of the intersection points, and electrically connected to the horizontal scanning lines and the vertical scanning lines; each of the switching elements is connected to the first electrode layer of the adjacent one electrochromic unit.

* * * * *